(12) United States Patent
Jacobsen et al.

(10) Patent No.: US 8,650,745 B2
(45) Date of Patent: Feb. 18, 2014

(54) THERMAL PROCESSING AND CONSOLIDATION SYSTEM AND METHOD

(75) Inventors: Ronald M. Jacobsen, Puyallup, WA (US); Antonin Pelc, Milton, WA (US); Calvin D. Bamford, Jr., Tacoma, WA (US); Terrance William Cooke, Tacoma, WA (US); Victor Wayne Croston, Port Orchard, WA (US); Russell Carver Warrick, Seattle, WA (US)

(73) Assignee: Globe Machine Manufacturing Company, Tacoma, WA (US)

( * ) Notice: Subject to any disclaimer, the term of this patent is extended or adjusted under 35 U.S.C. 154(b) by 0 days.

(21) Appl. No.: 13/290,867

(22) Filed: Nov. 7, 2011

(65) Prior Publication Data

US 2012/0114973 A1    May 10, 2012

Related U.S. Application Data

(60) Provisional application No. 61/410,753, filed on Nov. 5, 2010, provisional application No. 61/418,521, filed on Dec. 1, 2010, provisional application No. 61/495,661, filed on Jun. 10, 2011, provisional application No. 61/574,151, filed on Jul. 28, 2011.

(51) Int. Cl.
*B23P 19/00*    (2006.01)

(52) U.S. Cl.
USPC ............. 29/771; 29/722; 29/419.1; 264/511; 264/553; 264/101; 264/297.7; 428/615

(58) Field of Classification Search
USPC ................ 29/419.1, 722, 771, 822, 823, 824; 264/101, 102, 319, 511, 544, 553, 571, 264/297.6, 297.7; 425/436 R; 428/686, 457, 428/218, 426, 433, 428, 450, 221, 615
See application file for complete search history.

(56) References Cited

U.S. PATENT DOCUMENTS 3,334,383 A * 8/1967 Irvine .......................... 425/389
3,809,739 A * 5/1974 Gelin .......................... 264/297.6

(Continued)

FOREIGN PATENT DOCUMENTS

| DE | 10048974 A1 | 4/2002 |
|---|---|---|
| EP | 2239789 A1 | 10/2010 |

OTHER PUBLICATIONS

Schoeldgen et al., "Mehr Verarbeitungsfreiheit fuer Composites," Kunstoffe International, Carl Hanser Verlag, Munich, DE, vol. 100, No. 1, Jan. 1, 2010, pp. 26-28.

(Continued)

*Primary Examiner* — David Bryant
*Assistant Examiner* — Christopher Koehler
(74) *Attorney, Agent, or Firm* — Lowe, Hauptman & Ham, LLP

(57) ABSTRACT

A thermal processing and consolidation system is provided that includes an upper chamber assembly lower chamber assembly, layup and demolding station, transfer assembly, automatic or permanent coupling system, and controller. The upper and lower chamber assemblies are coupled to form an enclosed plenum operable to maintain a pressurized environment about a tool. The layup and demolding station receives the tool and facilitates the layup, bagging and sealing of unprocessed components at the tool. A transfer assembly accurately positions the tool on the lower chamber assembly in alignment with the upper chamber assembly. An automatic or permanent coupling system provides services to the tool and the enclosed plenum. A controller directs services to be supplied to the enclosed plenum and tool in accordance with a set of process parameters. This set of process parameters allows an individual set of unprocessed components to be thermally processed and consolidated.

17 Claims, 9 Drawing Sheets

(56) References Cited

U.S. PATENT DOCUMENTS

| | | | |
|---|---|---|---|
| 4,501,546 A * | 2/1985 | Valimont et al. | 425/388 |
| 4,510,103 A * | 4/1985 | Yamaguchi et al. | 264/408 |
| 4,738,814 A * | 4/1988 | Bowles et al. | 264/297.5 |
| 4,808,362 A | 2/1989 | Freeman | |
| 5,209,889 A * | 5/1993 | Brown et al. | 264/297.2 |
| 5,362,221 A | 11/1994 | Perkins | |
| 5,637,330 A * | 6/1997 | Younessian et al. | 425/183 |
| 6,558,590 B1 * | 5/2003 | Stewart | 264/40.5 |
| 6,991,449 B1 * | 1/2006 | Mead et al. | 425/389 |
| 7,208,219 B2 * | 4/2007 | Polk et al. | 428/292.1 |
| 2003/0030188 A1 * | 2/2003 | Spengler | 264/458 |
| 2003/0227107 A1 * | 12/2003 | Stewart | 264/236 |
| 2004/0241386 A1 * | 12/2004 | Polk et al. | 428/113 |
| 2005/0184416 A1 * | 8/2005 | McCollum | 264/40.5 |
| 2006/0233907 A1 * | 10/2006 | Ruiz et al. | 425/387.1 |
| 2008/0023622 A1 | 1/2008 | Schwoerer | |
| 2011/0006460 A1 * | 1/2011 | Vander Wel et al. | 264/403 |

OTHER PUBLICATIONS

Miracle D B et al., "Curing," Composites, ASM Handbook, USA, Jan. 1, 2001, pp. 486-491.

ISR for PCT/US2011/059434 mailed Feb. 23, 2012.

Nijzink H: "Automatisierungsstufen Beim Einfuehren Von Werkzeugwechselsystemen," Kunstoff International, Carl Hanser Verlag, Munchen, DE, vol. 80, No. 5, May 1, 1990, pp. 579-582, XP000165071.

"Temperiermittel Und Elektrik Automatisch Kuppeln," Kunstoffe International, Carl Hanser Verlag, Munchen, DE, vol. 80, No. 7, Jul. 1, 1990, p. 771, XP000159973.

ISR and Written Opinion for PCT/US2011/059434 mailed Jun. 5, 2012.

* cited by examiner

THERMAL PROCESSING AND CONSOLIDATION SYSTEM AND METHOD

RELATED APPLICATIONS

The present U.S. Utility patent application claims priority pursuant to 35 U.S.C. §119(e) to the following U.S. Provisional Patent Application which is hereby incorporated herein by reference in its entirety and made part of the present U.S. Utility patent application for all purposes:

1. U.S. Provisional Patent Application Ser. No. 61/410,753, entitled "METHOD OF MAKING COMPOSITE PARTS BY USING MEMBRANE PRESS,", filed Nov. 5, 2010.

2. U.S. Provisional Patent Application Ser. No. 61/495,661, entitled "RAPID CURE SYSTEM FOR THE MANUFACTURE OF COMPOSITE PARTS,", filed Jun. 10, 2011.

3. U.S. Provisional Patent Application Ser. No. 61/418,521, entitled "Systems and Methods for Forming Composite components."

TECHNICAL FIELD

The disclosure is related to a system to produce parts, such as composite parts, e.g., for the automobile, aerospace, sports and other industries utilizing composites. The system is capable of thermally processing and consolidating variable size, contoured, and flat parts while under pressure and optionally vacuum.

BACKGROUND

Composite materials are used to fabricate fiber reinforced composite (FRC) components that have found uses as critical components within modern, high performance aircraft, and are becoming more common in terrestrial applications such as the automotive industry or sports industry. Composite materials are desirable for many of their inherent attributes including light weight, high strength, and stiffness. Particularly for aircraft application, those composite material components, which may be large and complex in shape, are often flight critical necessitating strict assurance of material and structural integrity. Unfortunately, these materials are sometimes difficult and costly to fabricate.

Typical composite material components comprise two or more layers of woven and/or unidirectional fiber filaments (e.g. carbon fibers, glass fibers, etc.) which are impregnated by a plastic resin (e.g. an epoxy resin), in a final thermally processed and consolidated state. Methods for forming such composite components include vacuum bag molding, pressure bag molding, autoclave molding, and resin transfer molding (RTM).

New automotive industry regulations, including the Corporate Average Fuel Economy (CAFE), Head Impact Characteristic (HIC), and Pedestrian Protection, represent a challenge to conventional materials used in automobiles, such as steel. Relative to steel, FRC components provide an excellent combination of physical properties including strength, weight, and energy absorption. As such, FRC components are able to meet these new requirements, such as requirements for mass reduction and energy absorption. However, to become cost effective replacement for steel, the amount of time and cost required to manufacture with FRC components must be reduced. In addition, manufacturing FRC components with aesthetically pleasing surfaces, such as Class A surfaces can be both time consuming and difficult. A class A surface is nothing more than a surfaces having curvature and tangency alignment to achieve an ideal aesthetical reflection quality. Class A composite surfaces can have additional class A requirements pertaining to short range waviness, long range waviness, voids, and other defects and surface features. People often interpret class A surfaces to have curvature continuity from one surface to another.

Composite parts are often fabricated in an autoclave that may utilize vacuum, heating, cooling, and pressure. Typical process chambers include autoclaves, ovens, and compression presses with matched metal molds. Parts can be laid up by hand or by automated means into the mold profile and optionally bagged for vacuum forming. The prepared mold is typically transferred from assembly area into the process chamber by cart, conveyors, or other manual or automatic means. After closing the process chamber, the laminate is heated, formed to the profile of the mold by vacuum and/or pressure, and thermally processed and consolidated. When the process is finished, the assembly is extracted from the mold. Existing systems and processes for producing high performance composites are considered low production capacity with long cycle times, typically in the one hour to eight hour range. The heating is accomplished by hot air or heated molds that are slow to heat and slow to cool.

SUMMARY

Embodiments are directed to apparatus and methods of operation that are further described in the following Brief Description of the Drawings, the Detailed Description, and the Claims. Other features will become apparent from the following detailed description made with reference to the accompanying drawings.

An embodiment for the present disclosure provides a method for thermally processing and consolidating unprocessed components with a thermal processing and consolidation system. This method involves positioning a first tool on a lower chamber assembly, the first tool positioned in alignment with an upper chamber assembly, the first tool in contact with and supporting a set of unprocessed components. The upper chamber assembly couples to the lower chamber assembly to form an enclosed plenum, the plenum operable to maintain a pressurized environment about the first tool. Services are provided to the first tool via an automatic coupling system where the services allow the unprocessed components within the tool to be thermally processed and consolidated according to a set of process parameters.

Another embodiment provides a thermal processing and consolidation system. This thermal processing and consolidation system includes an upper chamber assembly, a lower chamber assembly, a first layup and demolding station, a transfer assembly, an automatic coupling system, and a controller. The upper chamber assembly couples to the lower chamber assembly to form an enclosed plenum, the enclosed plenum operable to maintain a pressurized environment about a tool. The first layup and demolding station receives the tool and facilitates the layup, bagging and sealing of unprocessed components at the tool. A transfer assembly accurately positions the tool on the lower chamber assembly in alignment with the upper chamber assembly. This transfer physically moves the tool from the layup and demolding station to the lower chamber assembly in alignment with the upper chamber assembly. An automatic coupling system provides services to the tool and the enclosed plenum. A controller coupled to the upper chamber assembly lower chamber assembly layup and demolding station, transfer assembly and automatic coupling system directs services to be supplied to the enclosed plenum and tool in accordance with a set of process parameters. This set of process parameters allows an individual set of unprocessed components to be in contact with and supported by the tool to be thermally processed and consolidated.

BRIEF DESCRIPTION OF THE DRAWINGS

For an understanding of embodiments of the disclosure, reference is now made to the following description taken in conjunction with the accompanying drawings in which like reference numerals indicate like features and wherein.

DETAILED DESCRIPTION

Figure 1:
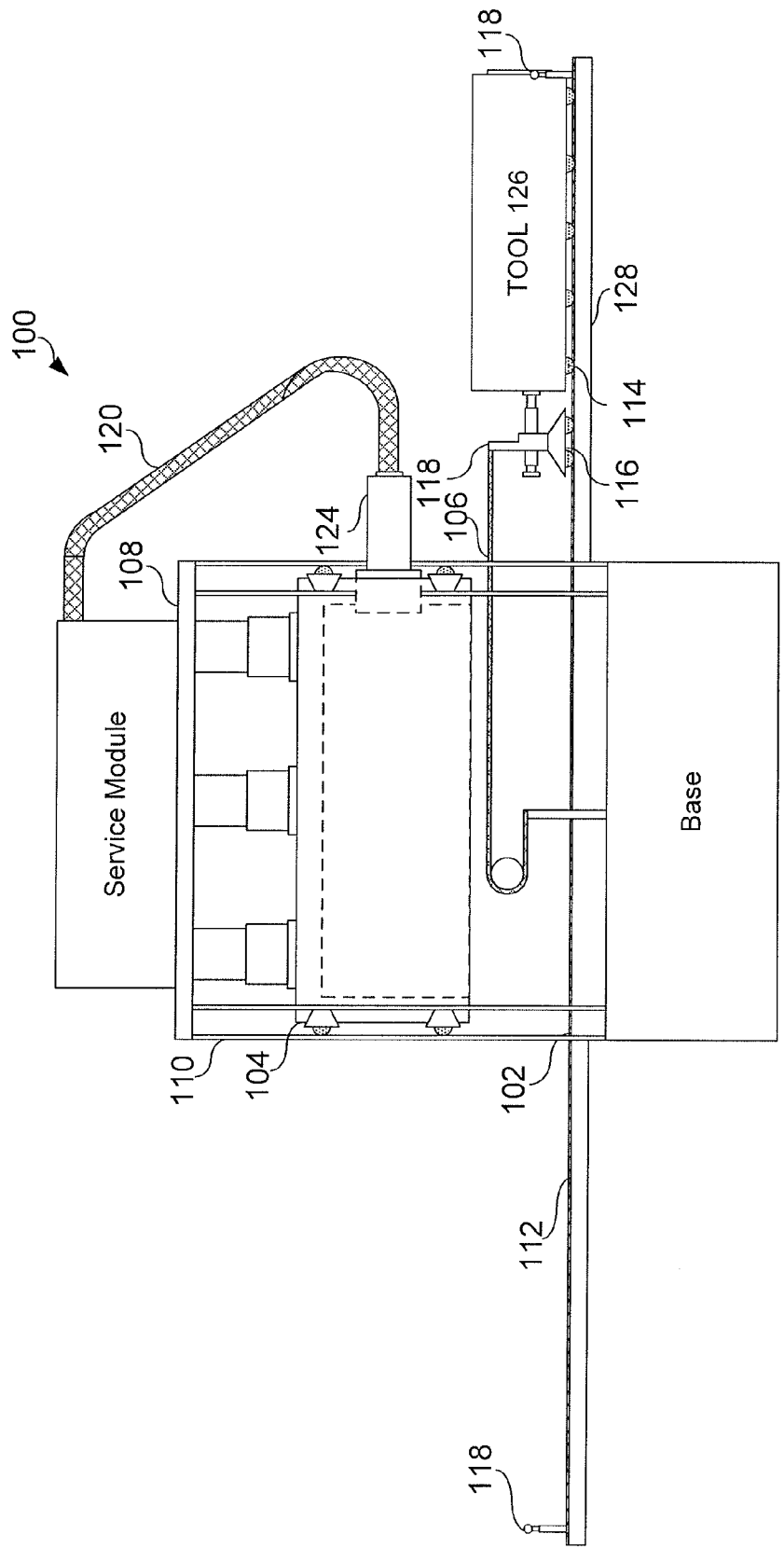
FIG. 1 is a side view of a thermal processing and consolidation system in accordance with an embodiment.

Some embodiments of the present invention will be now described with reference to the FIGs., like numerals being used to refer to like and corresponding parts of the various drawings.

Embodiments provide a system for forming composite components, such as carbon fiber reinforced plastics, glass fiber reinforced plastics, or fiber reinforced composite (FRC) components via thermal processing and consolidation. FRC components are useful in many industries, such as in the automotive, marine, military defense, aerospace, and medical equipment industries. Embodiments are especially useful for forming Class A FRC body panels across entire vehicle platforms. Examples of body panels and related parts include, but are not limited to, hoods, fenders, roofs, rockers, splitters, roof bows, dive planes, wings, mirror caps, deflectors, etc. Further examples of FRC components include, but are not limited to, deck-lids, battery applications, control arms, bumpers, sub-frames, and other structural components. Embodiments are not limited to forming any particular type of composite article, and such composite components can be of various sizes, shapes, and use. It is also to be appreciated that the embodiments are not limited to any particular industry.

An embodiment for the present disclosure provides a method for thermally processing and consolidating unprocessed components with a thermal processing and consolidation system. This method involves positioning a first tool on a lower chamber assembly, the first tool positioned in alignment with an upper chamber assembly, the first tool in contact with and supporting a set of unprocessed components. The upper chamber assembly couples to the lower chamber assembly to form an enclosed plenum, the plenum operable to maintain a pressurized environment about the first tool. The lower assembly may be a platen (i.e. flat surface) or a surface having some volume. Services are provided to the first tool via a service interface which may be a permanent or temporary automatic coupling system. The services allow the unprocessed components within the tool to be thermally processed and consolidated according to a set of process parameters (i.e. a temperature and pressure profile).

Another embodiment provides a thermal processing and consolidation system. This thermal processing and consolidation system includes an upper chamber assembly, a lower chamber assembly, a first layup and demolding station, a transfer assembly, an automatic coupling system, and a controller. The upper chamber assembly couples to the lower chamber assembly to form an enclosed plenum, the enclosed plenum operable to maintain a pressurized environment about a tool. The first layup and demolding station receives the tool and facilitates the layup, bagging and sealing of unprocessed components at the tool. A transfer assembly accurately positions the tool on the lower chamber assembly in alignment with the upper chamber assembly. This transfer physically moves the tool from the layup and demolding station to the lower chamber assembly in alignment with the upper chamber assembly. An automatic coupling system provides services to the tool and the enclosed plenum. A controller coupled to the upper chamber assembly lower chamber assembly layup and demolding station, transfer assembly and automatic coupling system directs services to be supplied to the enclosed plenum and tool in accordance with a set of process parameters. This set of process parameters allows an individual set of unprocessed components to be in contact with and supported by the tool to be thermally processed and consolidated.

FIG. 1 is a side view of a thermal processing and consolidation system in accordance with an embodiment. This thermal processing and consolidation system 100 includes a lower chamber assembly 102, an upper chamber assembly 104, a conveyer assembly 106 and hydraulic press 108, upper chamber assembly guide 110, a tool guide 112, a an integrated roller system 114 mounted to the tool, a push pull assembly 116, a plurality of tool placement sensors 118, air hoses 120, thermal oil hoses 122 and an automatic coupling system 124. In operations, a tool 126 at a layup and demolding station 128 may be loaded with a set of unprocessed composite material components or a set of components to be thermally processed and consolidated and/or prepped within the thermal processing and consolidation system provided. After the components have been laid up within or on tool 126, the components can be bagged. Alternatively, a membrane type press may be used to seal when a bag system is not used within the thermal processing and consolidation system. Another embodiment can use a permanently attached bag and seal system integrated into the upper chamber assembly. The push pull assembly 116 coupled to the tool and via the conveyer assembly 106, repositions tool 126 from the layup and demolding stations to a point on to a location on lower chamber assembly 102 in alignment with upper chamber assembly 104. A hydraulic press 108 may be used to couple and maintain pressure between the upper chamber assembly 104 and lower chamber assembly 102. The lower chamber assembly and the upper chamber assembly join together to create the plenum. Various sensors 118 along the tool guide 112 reports the position of the tool 126 to a controller (not shown) that directs the operation of the thermal processing and consolidation system.

Once aligned, the upper chamber assembly is lowered by the hydraulic press 108 to form a pressure seal with lower chamber assembly 102. The tool 126 aligns and mates to automatic coupling system 124. Automatic coupling system 124 may provide a variety of services to the tool and an enclosed plenum formed by the upper chamber assembly 104 and lower chamber assembly 102. These services may include high pressure fluids or gases used to pressurize the environment of the plenum about tool 126. Vacuum can be used to withdraw air or other gases from the set of components to be thermally processed and consolidated at tool 126. Thermal oils in one embodiment may be used to heat via conduction and/or convection the components to be thermally processed and consolidated. Other embodiments may position radiators, infrared panels, resistive heating panels or other heating systems to provide heat to thermal processing and consolidation of the components within tool 126. As the tool may encompass 80% or more of the plenum, (with or without the use of spacers and partitions) the heat exchange systems provide a more efficient method of controlling the thermal profile of the components during processing than previously available when using a traditional autoclave. For example, in an autoclave the tools may take less than 20% of the chamber volume. This means that rapid changes in temperature in an autoclave are either very inefficient thermally, that the tool and material is heated unevenly due to the low thermal transfer rates of most autoclaves and the high thermal mass of most tooling, and as a result even heating and control of the autoclave, tooling and material is difficult to achieve. Runaway exothermic reactions in certain materials, due to limited thermal transfer capability of most autoclaves, is another drawback of most autoclave systems which can heat the autoclave air at relatively fast rates, but which do not have sufficient thermal energy transfer rates to draw sufficient exothermic heat out of the material. The thermal processing and consolidation system described herein has thermal transfer capabilities sufficient for controlling most exothermic reactions, which are typically a result of fast heating rates of reactive materials. The components at tool 126 are thermally processed and consolidated according to a pressure and temperature profile maintained as a set of process parameters and executed by the controller. After thermally processing and consolidating, the plenum is depressurized prior to opening. Also prior to opening, the automatic coupling system may be retracted from the tool. This automatic coupling system is a self-sealing system such that thermal oils, hydraulics or other fluids contained within the tools, do not leak within the plenum on the lower chamber assembly from either the tool side or the upper chamber assembly side of the automatic chamber coupling system. The upper chamber assembly is raised to a height to accommodate the insertion and withdrawal of tool 126.

Figure 2:
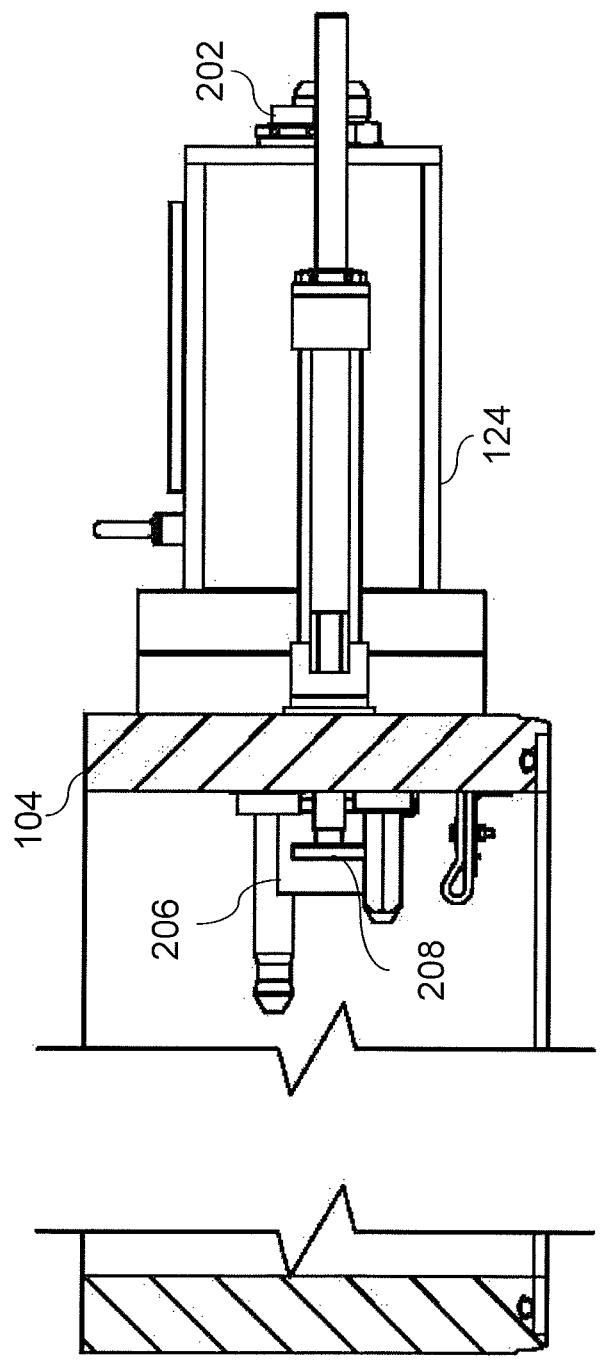
FIG. 2 is a cross section view of an automatic coupling system in accordance with an embodiment.

FIG. 2 is a more detailed cross section of the automatic coupling system 124 in accordance with an embodiment. FIG. 2 shows upper chamber assembly 104 with automatic coupling system 124 penetrating the upper chamber assembly 104. This coupling system will include an external connections 202 for the various services and internal self-sealing connections 206 that provide self-sealing and automatic coupling between tool 126 and the automatic coupling system 124. As previously described, the services provided to external connections 202 may include thermal fluids to heat and/or cool the tool and components according to the set of process parameters, vacuum to withdraw gases from the unprocessed components, gasses or fluids to pressurize the plenum according to the set of process parameters, a communication pathways to exchange information and/or control signals between the tool or plenum and the thermal processing and consolidation system, injection materials to be injected into the unprocessed components, and/or hydraulics to actuate mechanical systems within the automatic coupling system that allow the tool to be secured to the automatic coupling system. Withdrawing gasses serves not only to remove gasses, but also reduces voids that would result if the gasses were not removed. Withdrawing gasses through vacuum application consolidates the laminate by creating a differential pressure, causing the membrane/vacuum bag to compress the laminate at atmospheric pressure, or the differential pressure, if partial vacuum is utilized. The differential pressure created by the vacuum application underneath the membrane/vacuum bag allows positive atmospheric pressure (greater than one atmosphere and up to 500 psi or more) to be exerted onto the materials placed between the tool and the membrane/vacuum bag.

Hydraulics can be used to operate locking mechanisms that secures the tool to the automatic coupling system 124. The coupling system locking system can be hydraulic or electromechanical. Hydraulic push/pull system 208 allows for engaging/disengaging the tool with the chamber assembly. In other embodiments, push/pull system 208 may also serve as an engaging/disengaging mechanism that provides the locking mechanism. Communication pathways may provide an electronic or optical path for sensor information collected within the plenum or from the tool to be provided from the automatic coupling system to the controller. This may allow for the controller to monitor and control various stages of the process executed during the process, manipulate the flow of thermal oils, or the heat transfer between the tool and exterior sources. Further, identification encoded on the tool may be provided via a communication pathway to the controller to ensure that the proper set of process parameters is selected based on the components and the tool id. Although optional, identification encoded in the tool facilitates a seamless connection between the tools and associated stored process parameters, so that when using multiple unique tools in one system, the stored process parameters are automatically selected based on the tool in position to be processed.

In at least some embodiments, suitable preform tools are used to support, layup, bag and seal the unprocessed components. These tools may use fluids to heat and cool the tool, with the preform tool used to form the composite components.

Figure 3:
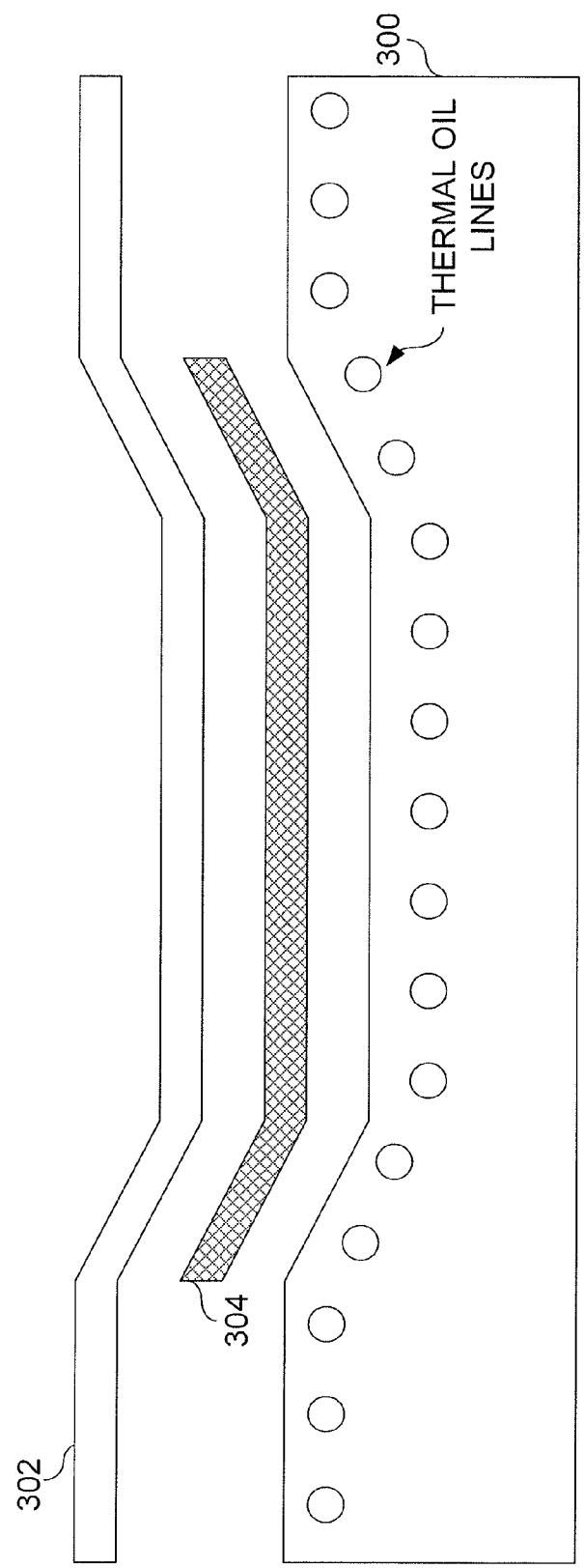
FIG. 3 is a partial cross-section view of a mold tool having preformed materials disposed on the mold tool in accordance with an embodiment.

FIG. 3 is a view of a mold tool having preformed materials disposed on the mold tool in accordance with an embodiment. Mold tool 300 can interface with press 302. Press 302 may also be referred to as a pressure press, or bladder press, or diaphragm/membrane press. The mold tool 300 is useful for holding unprocessed components 304 thereon. Optionally, unprocessed components 304 are formed with the preform tool, and generally include a fiber mat and resin. This may include carbon fiber, glass fiber, preimpregnated fiber and plastic fiber mats; and resin film layers or injected resins. Components could also be manually or automatically formed directly in the tool. The mold tool 300 can be heated and/or cooled to interact with the resin of the unprocessed components 304.

Figure 4:
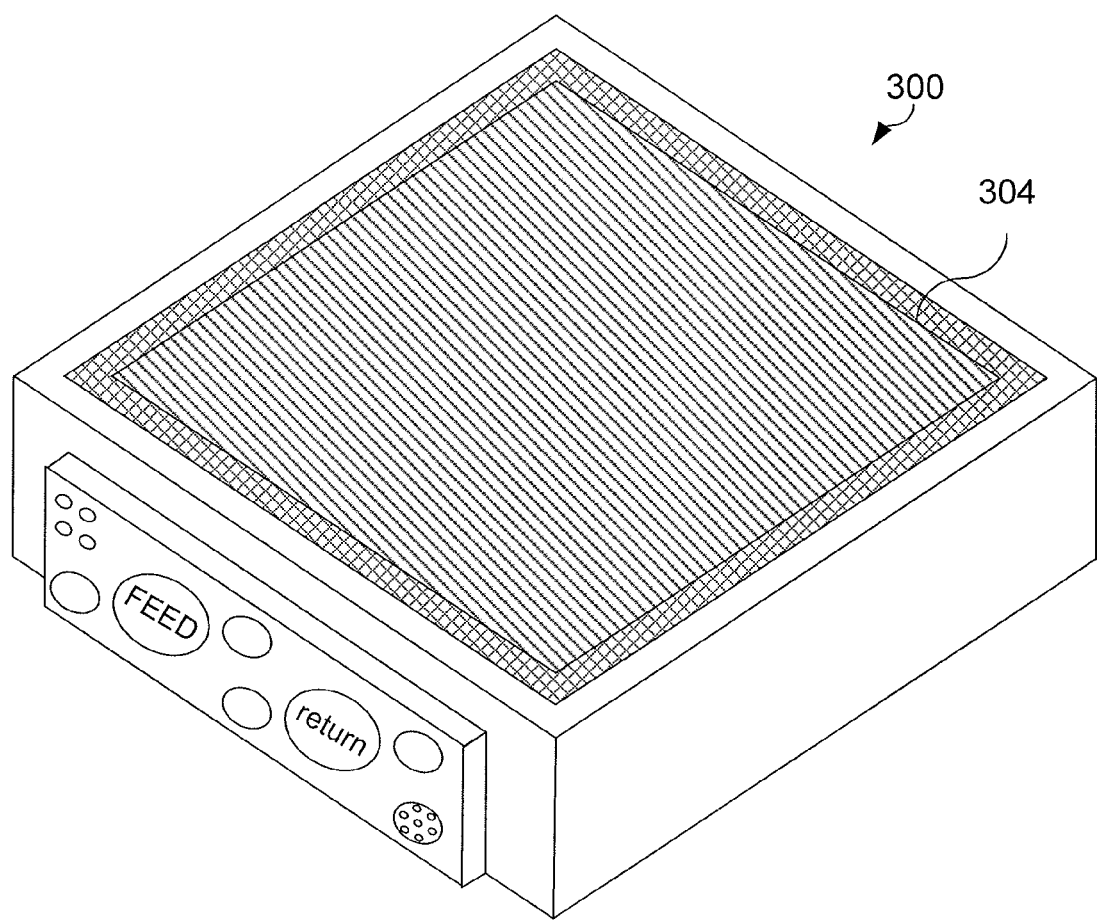
FIG. 4 is a partial perspective view of the mold tool with a vacuum bag disposed on the mold tool in accordance with an embodiment.
Figure 5:
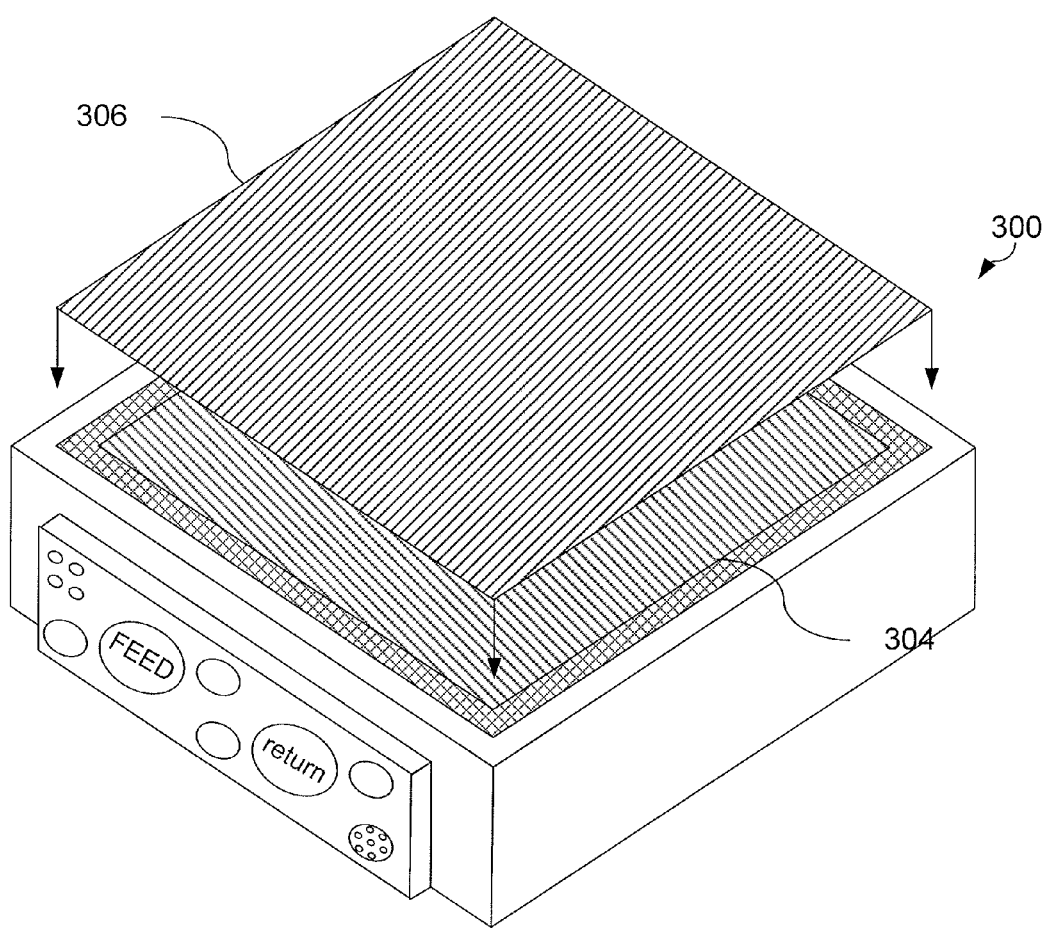
FIG. 5 is a partial perspective view of the press and mold tool with the vacuum bag disposed over the preformed material and on the mold tool in accordance with an embodiment.

FIG. 4 is a partial perspective view of the mold tool. FIG. 5 is partial perspective view of the mold tool with the vacuum bag disposed over the preformed material and on the mold tool. Referring to FIGS. 4 and 5, vacuum bag 306 is shown disposed on the mold tool 300. The vacuum bag 306 is useful for forming the FRC component from the unprocessed components 304. The vacuum bag 306 can be of various configurations. The vacuum bag 306 is re-sealable with an integrated release for ease of use. The bag may include a stack of materials including seal tape, peel ply/release film (sometimes perforated), breather layer, and barrier film topped by a flexible membrane (silicone is common), or single use vacuum bag film. In one embodiment, the bagging system is a one-piece reusable bag that includes a preformed silicone membrane with a permanent release film coating on the material side of the bag, and an integrated breather/seal perimeter. The vacuum bag 306 can be evacuated and is useful for driving the resin into the fiber mat of the unprocessed components 304. In other embodiments, the resin may be injected into the unprocessed components layed up in the tool as one of the supplied services provided through automatic coupling system. In certain embodiments, the vacuum bag 306 provides for the elimination of components, such as a breather layer, release film, and/or tape. Other embodiments may incorporate vacuum bag in an interior surface of the upper chamber assembly or use a membrane incorporated with the upper chamber assembly for formng the FRC components.

Figure 6:
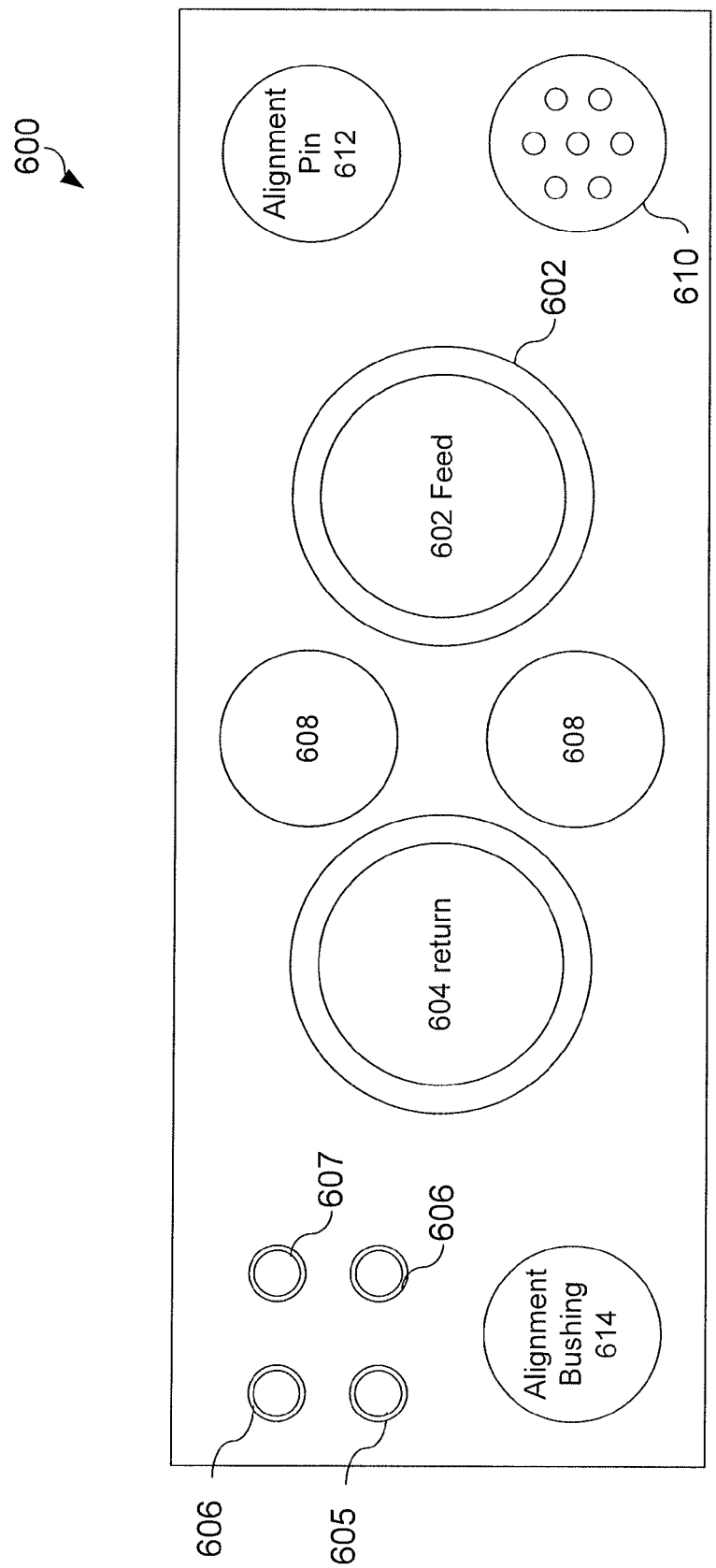
FIG. 6 is a view of a tool-connection system plate for the automatic coupling system that couples the mold tool with the thermal processing and consolidation system in accordance with an embodiment.

FIG. 6 is a view of a tool-connection system plate for the automatic coupling system that couples the mold tool with the thermal processing and consolidation system. The tool-connection system 600 includes exterior and interior connections 602 for feed and return of thermal fluid, exterior and interior connections 604 for a vacuum line, a static line 606 for pressure monitoring of the mold tool, exterior and interior connections 608 for pressurizing the enclosed plenum and a communication pathway connection 610 for the exchange of information such as but not limited to a resistive thermal device (RTD) for temperature monitoring and providing feedback of the mold tool. Temperature monitoring may also be implemented by thermocouples, optical pyrometers and other like systems. Embodiments may monitor the actual temperature or the rate of change in the temperature. The tool-connection system includes a plurality of connections for connecting various elements to the mold tool 300, such as fluid feeds, fluid returns, and sensors. In general, the elements provide services and communication with the mold tool 300. These elements are generally in communication with the mold tool 300, such as being in fluid communication with the mold tool 300.

In some embodiments the tool-connection system includes a resistive thermal device (RTD) male and female connector for temperature monitoring and feedback of the mold tool 300. In addition to or alternate to an RTD, other forms of temperature and pressure measurement of the mold tool 300 can also be utilized. These forms include thermocouples, optical pyrometers and other like systems. Embodiments may monitor the actual temperature or the rate of change in the temperature.

The internal connections of the self-coupling system include connections for feed and return of thermal fluid, connections for a vacuum and static line for pressure monitoring of the press, and a communication pathway connection (optical or electrical) to relay for temperature and pressure monitoring data and identification data to the controller. The internal connections 600 of the automatic coupling system also include a thermal fluid exhaust valve 602 for feeding thermal fluid to the tool, a thermal fluid intake valve 604 for returning the thermal fluid, a first alignment pin 612, a vacuum connector 605 and a static connector 606 for pressure monitoring of the plenum, a locking ring operated by hydraulic actuators supplied by connector 607, and a second alignment pin or bushing 614.

By pressurizing the plenum, pressure is applied to the mold tool 300 and unprocessed components during a press cycle to form the FRC component from the unprocessed components 304. The plenum and mold tool 300 have a pressure, temperature and or vacuum profile which is imparted by the internal connections 600 of the automatic coupling system. The thermal processing and consolidation system includes a lower frame for supporting the mold tool 300.

Operation of the thermal processing and consolidation system, including positioning of the tool and the temperature and pressure applied is monitored and controlled by a programmable logic controller (PLC). The PLC may be implemented using shared processing devices and/or individual processing devices. Processing devices may include microprocessors, micro-controllers, digital signal processors, microcomputers, central processing units, field programmable gate arrays, programmable logic devices, state machines, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Typically, connection between the mold tool 300 and the thermal processing and consolidation system is automated with a common connection design after the upper chamber assembly joins the lower chamber assembly. Specifically, the tool and the internal connections 600 of the automatic coupling system couple and engage with one another once the mold tool enters the plenum. Once coupled, the mold tool 300 and the thermal processing and consolidation system are in fluid (and, typically, electrical communication) with one another. Coupling of the elements is generally as follows (once the mold tool 300 and automatic coupling system are brought together): the vacuum connectors couple, the static connectors couple, the male locking pin and the female locking ring couple, the alignment bushings and the alignment pins couple, the RTD male connector and the RTD female connector couple, the thermal fluid intake valves couple, and the thermal fluid exhaust valves couple. The fluid containing connections are self-sealing to prevent the leakage of fluids to the plenum during this procedure. Such a configuration provides for manufacturing versatility, such as allowing for multiple tool variations (e.g. mold tool 300 variations) to be utilized with no affiliated change over time. For example, various configurations of mold tools 300 can be utilized and simply "plugged into" the thermal processing and consolidation system via the connection system. It is to be appreciated that the mold tool 300 can be of various sizes, shapes, and configurations.

The thermal processing and consolidation system can create a closed pressurized environment capable of being pressurized to various pressures in various amounts of time depending on the needs of the unprocessed components. For example, the thermal processing and consolidation system can create an enclosed plenum capable of being pressurized to about 150 psi in about 2 minutes. The plenum can also be pressurized to higher or lower than 150 psi, in various amounts of time greater or less than 2 minutes. The processing pressure being in the range of 80 to 150 psi, but could be more or less depending on material and desired part characteristics. The processing pressure in at least some embodiments can be significantly greater than 150 psi; for example one embodiment may use a pressure of about 300 psi. Similarly, the processing pressure in at least some embodiments can be significantly less than 80 psi. The pressure or pressure range selected depends upon the properties of the unprocessed components and resins, materials, or adhesives used in processing.

Figure 7:
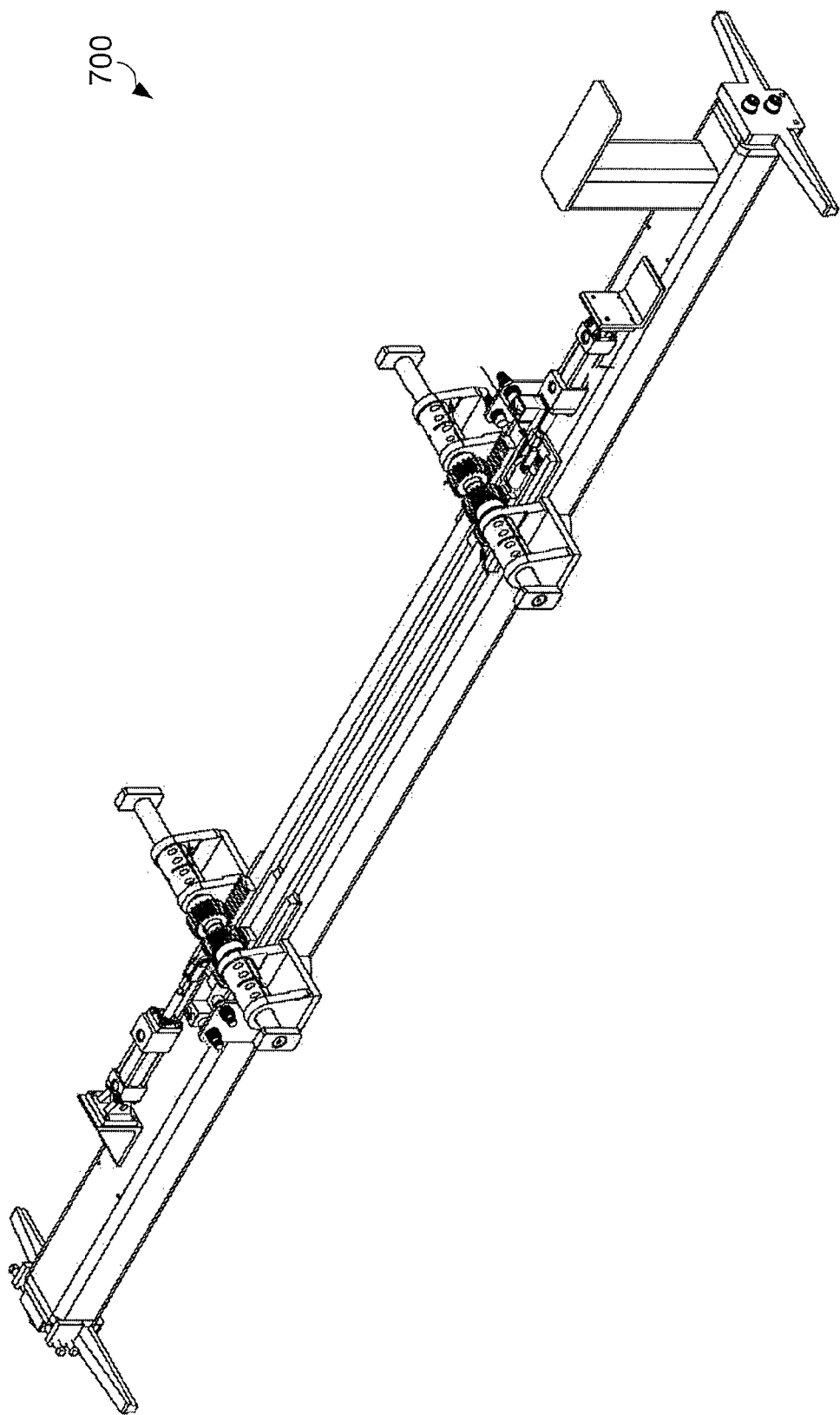
FIG. 7 is a partial perspective scaled engineering drawing of a feed mechanism to move the mold tool into the press for the press cycle to begin and to remove one or more mold tools from the press after the press cycle is complete in accordance with an embodiment.

In at least some embodiments hydraulic actuator system within the upper chamber assembly of FIG. 1 provides selective pressure to some or the entire mold tool 300, and therefore presses the unprocessed components 304. A human machine interface (HMI) such as a graphical user interface (GUI) can be used to monitor and control process parameters associated with the process. The process parameters include pressure, vacuum, and/or temperature of the plenum and tool during the process cycle FIG. 7 is a partial perspective scaled engineering drawing of a feed mechanism to move the mold tool into the press for the press cycle to begin and to remove one or more mold tools from the press after the press cycle is complete in accordance with an embodiment. Feed mechanism 700 feeds the mold tool 300 into the thermal processing and consolidation system for the press cycle and removes the mold tool 300 from the thermal processing and consolidation system after the press cycle. The feed mechanism 700 can couple to a tray to hold, send and receive the mold tool 300. In at least one embodiment, the feed mechanism is a powered pusher/puller bar that couple to the tool or tray. In at least some embodiments, the tray may interface with the upper chamber assembly and lower chamber assembly to form the pressure boundary. The tray may also have internal lines and connections that allow the services to be provided to the tool through the shuttle table or tray. The tray may also be part of the lower chamber assembly.

Figure 8:
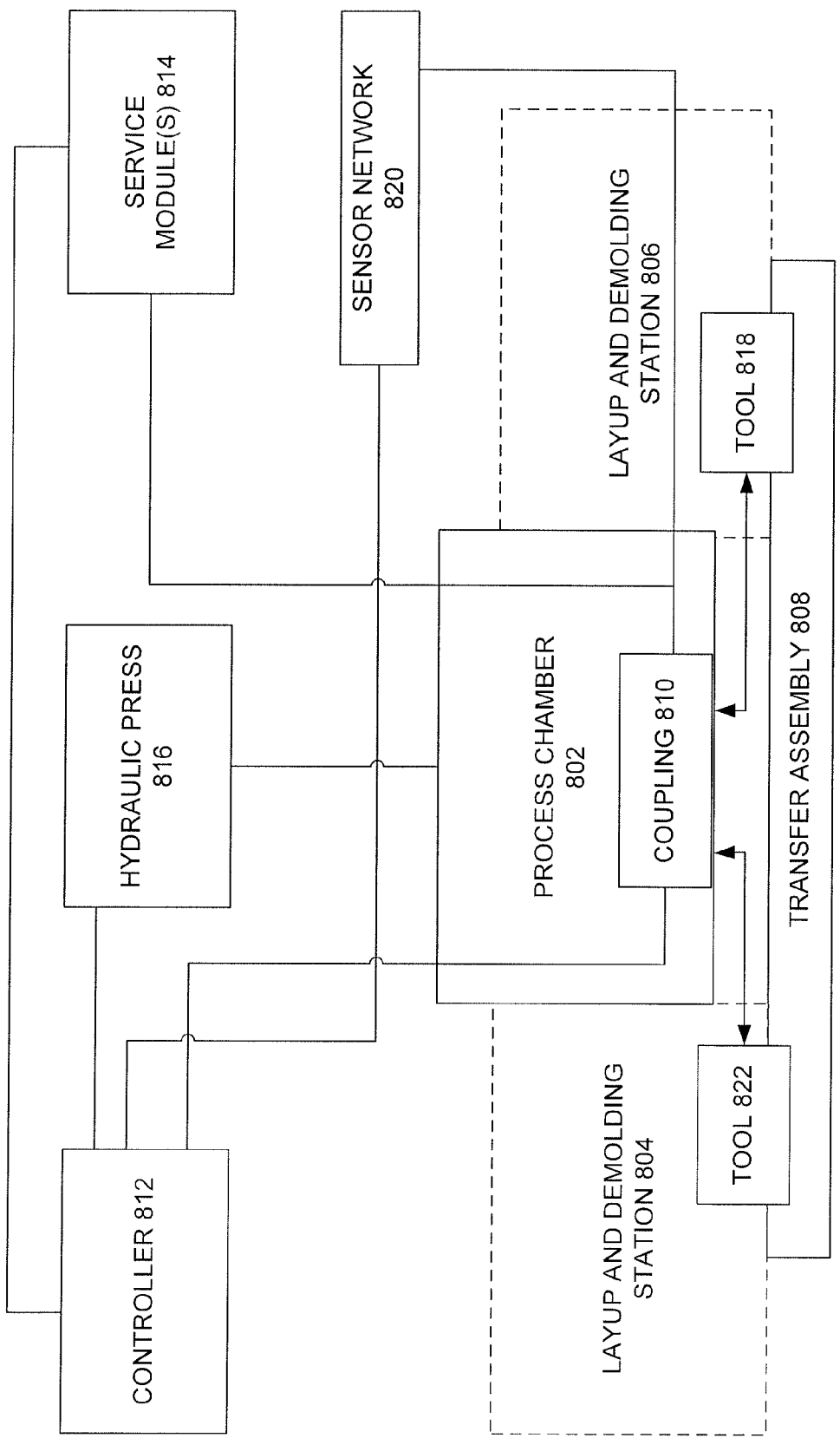
FIG. 8 is a block diagram of a thermal processing and consolidation system in accordance with an embodiment.

FIG. 8 provides a block diagram of a thermal processing and consolidation system 800 in accordance with an embodiment. Thermal processing and consolidation system 800 includes a process chamber 802, at least one layup and demolding station 804, optional additional lay-up and demolding station(s) 806, transfer assembly 808, coupling system 810, controller 812, and service modules 814. Process chamber 802 provides a pressurized enclosed plenum that may be formed from an upper chamber assembly joining a lower chamber assembly wherein the upper chamber assembly is coupled and uncoupled to the lower chamber assembly via a hydraulic press system 816. The layup and the molding station 804 receives a tool 818 wherein the tool may serve as a support for unprocessed components to be processed, i.e., thermally processed and consolidated within the process chamber. Layup may involve layup, bagging and sealing the unprocessed components to the tool 818 prior to transfer from the layup and demolding station 804 to the process chamber 802 via the transfer assembly 808.

Controller 812 couples to a sensor network 820, hydraulic press 816, process chamber 802, layup and demolding stations 804, optional layup and demolding stations 806, transfer assembly 808, coupling modules 810, and service modules 814. The transfer assembly directs movement of the tool from the layup and demolding station 804, to process chamber 802. The tool is positioned such that the tool can couple to coupling modules 810 in an automatic fashion. The controller 812 may then direct the process chamber to be closed and the services such as heating, cooling, pressurization, vacuum, and the exchange of information/data can be provided via the service module(s).

The controller 812 directs the service modules to execute a set of process parameters that cures the components laid-up within tool 818 according to a predetermined pressure, temperature, and/or vacuum profile.

In at least some embodiments, additional layup and demolding stations are provided that may receive additional tools 822. This allows an additional set of unprocessed components to be laid-up, bagged and sealed in tool 822 while a first set of unprocessed components are processed on tool 818. This allows throughput to be greatly enhanced by allowing the process chamber downtime to be minimized to only the time required to transfer a tool in and out of the process chamber.

Coupling system 810 may penetrate the process chamber walls, lower chamber assembly or a tray supporting tools and provide services to the interior of the process chamber and the tool as required by the set of process parameters. All these coupling systems may be self-sealing systems such that process fluids are not leaked within the process chamber or on the tool. These services again may include thermal fluids to exchange heat with the tool or other heat exchange structures located within the process chamber, vacuum to withdraw gases from the unprocessed components, gases to pressurize the enclosed plenum of the process chamber 802, communication pathways that allow sensors within the process chamber and tool to communicate process data back to controller 812. Further identification information associated with the tool 818 or tool 822 may be used by controller 812 to determine the set of process parameters to be executed in order to cure the unprocessed component. Injection materials such as resins may be injected into unprocessed components laid-up and bagged within the tool while the tool is already located within the process chamber. Hydraulics may also be used to secure the tool to the coupling system as directed by controller 812. To expedite processing, tools 818 and 822 may comprise a cradle that receives a slipper. This slipper can hold a set of unprocessed components. When the slipper is received at a layup and demolding station, the slipper may be placed as a unit on a cradle to facilitate the layup of the components within the tool. Numerous slipper tools can be used where the labor associated with the layup in the slipper tool is substantially longer than the thermal processing/consolidation cycle. The slipper tool approach allows for reduced cost when compared to creating numerous complete tools. The slipper may comprise the outer shell, which can be "laid-up" and vacuum bagged, prior to being placed into the heated cradle tool which transfers in and out of the chamber/plenum.

These components may be made from composite materials, utilizing reinforcing fibers such as but not limited to glass, carbon, ceramic, metallic or polymeric fibers; composite matrix materials such as but not limited to thermosetting polymers, thermosetting polymeric matrix composites, thermoplastic polymeric matrix composites, thermoplastic polymeric resins, thermosetting polymeric resins; fiber/metal interleaved laminates, fiber/low-density-core interleaved composites, low-density-cored composite laminates, metal matrix composites, low melting point metals, low melting point metal matrix composites; and metals with adhesives or polymeric adhesives.

The plenum of process chamber 802 may have a variable volume affected by the installation and removal of spacers or partitions in order to allow the volume of the plenum to substantially match the size of the tool being processed. Other types of heating and cooling may include the use of infrared radiation and/or microwave radiation.

Figure 9:
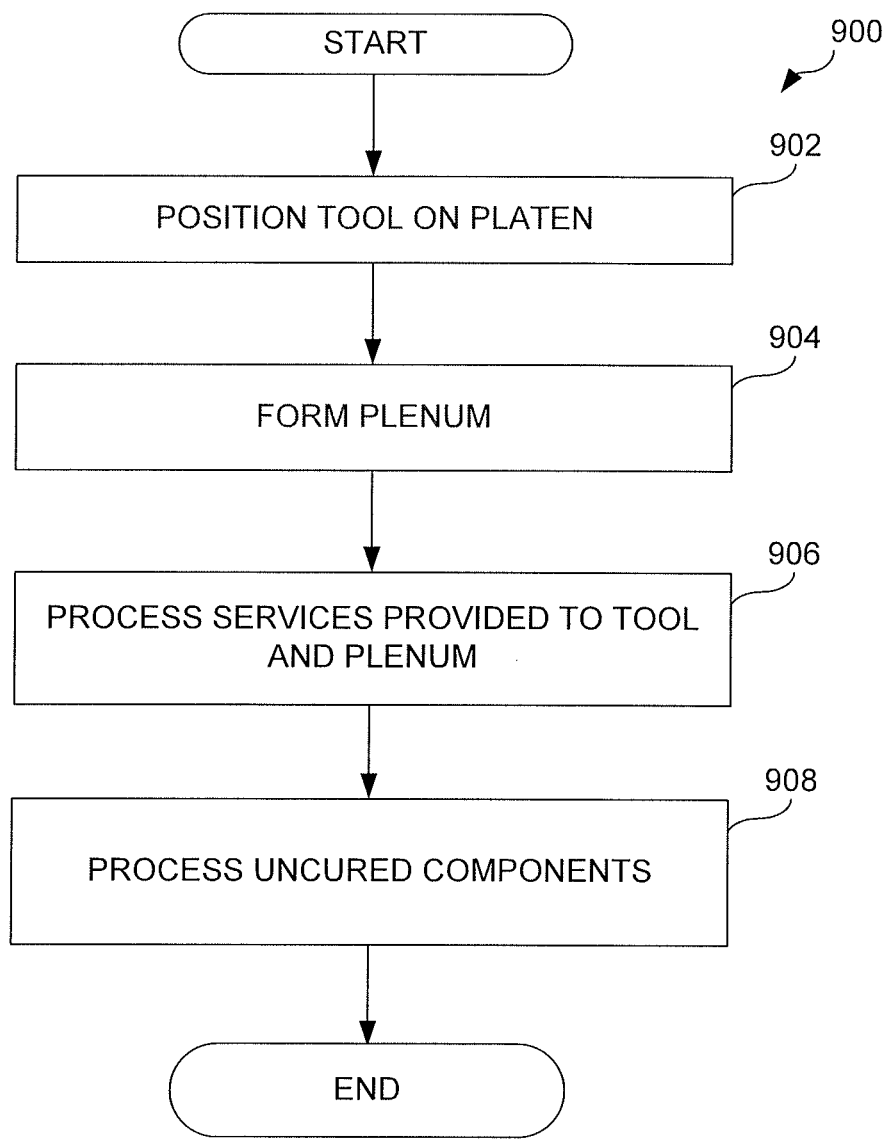
FIG. 9 is a logic flow diagram associated with a method of thermally processing and consolidating unprocessed components within a thermal processing and consolidation system in accordance with an embodiment.

FIG. 9 is a logic flow diagram (e.g., performed by controller 812) associated with a method of thermally processing and consolidating unprocessed components within a thermal processing and consolidation system in accordance with an embodiment. Operations 900 begin in block 902 wherein a first tool is positioned on a lower chamber assembly. The first tool is positioned in alignment with an upper chamber assembly where this first tool supports a first set of unprocessed components. These components may be metal, composite materials, fiberglass, thermoset materials, thermoplastics or other like materials. In block 904 the upper chamber assembly and lower chamber assembly join or couple to form a plenum. This plenum may provide a pressurized environment about the tool and unprocessed components to be in contact with and supported therein. The pressurized environment may be controlled to have a specific pressure profile to support the processing of the unprocessed components within the upper chamber assembly. In block 906 services are provided to the tool in the plenum via a coupling system. The services may include the provision of injection materials, gases or fluids to pressurize the plenum, thermal oils or fluids used to exchange heat with the tool or heat exchange structures within the plenum, communication pathways to exchange information, data and/or electrical signals including power signals to the tool and other features within the plenum, and vacuum where vacuum may be applied to the unprocessed components in accordance with the set of process parameters.

In block 908 the unprocessed components are processed or thermally processed and consolidated within the plenum as directed by a set of process parameters. Further steps associated with the processing of unprocessed components may be the engagement and disengagement of the tool as a plenum via a coupling system. As previously described the services may be permanently attached to the tool and/or plenum or as currently described they may be coupled or uncoupled as needed. The upper chamber assembly may be opened in such a manner to minimize the separation between the upper chamber assembly and the lower chamber assembly such that the opening is sufficient only for the transfer of tools to and from the alignment positions within the plenum. This positioning may be facilitated by a transfer assembly that couples to a layup and demolding station where the tool may be prepared for processing and the process component may be removed after processing. This transfer assembly may in at least some embodiments simultaneously withdraw one tool from the plenum while positioning an additional tool on the lower chamber assembly in alignment with the upper chamber assembly for further processing. This minimizes the time that the plenum need be opened.

In summary, embodiments provide a thermal processing and consolidation system. This thermal processing and consolidation system includes an upper chamber assembly, a lower chamber assembly, a first layup and demolding station, a transfer assembly, an automatic coupling system, and a controller. The upper chamber assembly couples to the lower chamber assembly to form an enclosed plenum, the enclosed plenum operable to maintain a pressurized environment about a tool. The first layup and demolding station receives the tool and facilitates the layup, bagging and sealing of unprocessed components at the tool. A transfer assembly accurately positions the tool on the lower chamber assembly in alignment with the upper chamber assembly. This transfer physically moves the tool from the layup and demolding station to the lower chamber assembly in alignment with the upper chamber assembly. An automatic coupling system provides services to the tool and the enclosed plenum. A controller coupled to the upper chamber assembly lower chamber assembly layup and demolding station, transfer assembly and automatic coupling system directs services to be supplied to the enclosed plenum and tool.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled".

The foregoing description of some embodiments of the invention has been presented for purposes of illustration and description. It is not intended to be exhaustive or to limit the invention to the precise form disclosed, and modifications and variations are possible in light of the above teachings or may be acquired from practice of the invention. The specifically described embodiments explain the principles and practical applications to enable one ordinarily skilled in the art to utilize various embodiments and with various modifications as are suited to the particular use contemplated. It is intended that the scope of the invention be defined by the claims appended hereto, and their equivalents. Further, it should be understood that various changes, substitutions and alterations can be made hereto without departing from the spirit and scope of the invention as described by the appended claims.

The invention claimed is:

1. A thermal processing and consolidation system, comprising:
    an upper chamber assembly;
    a lower chamber assembly, wherein the upper chamber assembly and the lower chamber assembly are movable relative to one another, and wherein the upper chamber assembly and the lower chamber assembly are operable to couple to one another and form an enclosed plenum, the plenum is operable to maintain a pressurized and/or temperature controlled environment;
    a tool for receiving a set of unprocessed components, the tool being moveable to a first position on the lower chamber assembly in alignment with the upper chamber assembly to be completely enclosed in the plenum, from a second position where the tool is not enclosable within the plenum;
    a flexible member positionable over the set of unprocessed components within the tool and free of attachment to the upper and lower chamber assemblies when the tool is at the second position;
    a coupling system operable to provide services to the tool and the plenum; and
    a controller coupled to the upper or lower chamber assembly and the coupling system, the controller operable to direct the services to the tool in accordance with a set of process parameters for thermally processing and curing the set of unprocessed components within the tool when the tool is enclosed in the plenum.

2. The thermal processing and consolidation system of claim 1, further comprising:
   at least one additional tool for receiving at least one additional set of unprocessed components; and
   a transfer assembly;
   the controller operable to direct the transfer assembly to withdraw the tool from the first position while simultaneously positioning the at least one additional tool to the first position following thermal processing and consolidation of the set of unprocessed components within the tool.

3. The thermal processing and consolidation system of claim 1, wherein the coupling system includes a permanent connection that penetrates the upper or lower chamber assembly to supply the services to the tool within the enclosed plenum.

4. The thermal processing and consolidation system of claim 3, wherein the coupling system further comprises an automatic coupling arrangement configured to automatically couple the tool within the enclosed plenum with the permanent connection to supply services to the tool within the enclosed plenum.

5. The thermal processing and consolidation system of claim 4, wherein the automatic coupling between the tool within the enclosed plenum and the permanent connection is self-sealing.

6. The thermal processing and consolidation system of claim 4, wherein the services supplied via the coupling system directly to the tool within the enclosed plenum comprise at least one of:
   thermal fluids to heat and/or cool the unprocessed components according to the set of process parameters;
   vacuum to withdraw gases from the unprocessed components in the tool within the enclosed plenum;
   communication pathways to exchange information and/or control signals between the tool within the enclosed plenum and the controller; or
   injection materials to be injected into the unprocessed components.

7. The thermal processing and consolidation system of claim 4, wherein the automatic coupling arrangement comprises a pull-push mechanism configured to
   automatically engage the tool within the enclosed plenum with the permanent connection to effect the automatic coupling between the tool and the permanent connection for connecting the services to the tool when the tool is within the enclosed plenum, and
   automatically disengage tool within the enclosed plenum from the permanent connection to release the automatic coupling between the tool and the permanent connection for disconnecting the services from the tool when the tool is to be withdrawn from within the enclosed plenum to the second position or to a third position where the tool is not enclosable within the plenum, leaving the tool free of interconnecting piping and wiring when the tool is at the second or third position.

8. The thermal processing and consolidation system of claim 1, further comprising a tray operable to:
   hold the tool;
   deliver services to the tool; and
   form the plenum in combination with the upper chamber assembly and the lower chamber assembly.

9. The thermal processing and consolidation system of claim 8, further comprising at least one additional tool for receiving at least one additional set of unprocessed components;
   wherein the tray is operable to:
   hold the at least one additional tool, reposition such that the at least one additional tool is aligned to the upper chamber assembly and the lower chamber assembly; and
   form the plenum in combination with the upper chamber assembly and the lower chamber assembly about the at least one additional tool.

10. The thermal processing and consolidation system of claim 1, further comprising:
    a vacuum device couplable to the tool to withdraw gases from the unprocessed components between the flexible member and the tool, and to cause the flexible member to compress and exert pressure on the unprocessed components between the flexible member and the tool.

11. The thermal processing and consolidation system of claim 1, wherein the tool comprises:
    a cradle, and
    a slipper for receiving the set of unprocessed components, the slipper positionable in and removable from the cradle.

12. The thermal processing and consolidation system of claim 1, wherein the flexible member comprises a membrane or a vacuum bag and is free of permanent attachment to the upper and lower chamber assemblies.

13. A thermally processed and consolidated material made by the thermal processing and consolidation system of claim 1, wherein the unprocessed components comprise at least one type of unprocessed components selected from the group consisting of:
    composite materials, comprising: glass, carbon, ceramic, metallic and/or polymeric fibers;
    and composite matrix materials comprising thermosetting polymers, thermoplastic polymers;
    thermosetting polymeric matrix composites, thermoplastic polymeric matrix composites;
    thermoplastic polymeric resins, and or thermosetting polymeric resins;
    fiber/metal interleaved laminates;
    fiber/low-density-core interleaved composites;
    low-density-cored composite laminates;
    metal matrix composites;
    low melting point metals;
    low melting point metal matrix composites; and
    metals bonded with polymeric adhesives.

14. The thermal processing and consolidation system of claim 1, further comprising
    a hydraulic press configured to press the upper chamber assembly against the lower chamber assembly, and to form a pressure seal between the upper chamber assembly and the lower chamber assembly, wherein the pressure seal is configured to maintain a pressure of 300 psi in the enclosed plenum.

15. The thermal processing and consolidation system of claim 1, wherein the upper chamber assembly is moveable downwardly towards the lower chamber assembly, and wherein the upper chamber assembly is operable to couple to the lower chamber assembly and form an enclosed plenum.

16. A thermal processing and consolidation system, comprising:
    an upper chamber assembly;
    a lower chamber assembly, the upper chamber assembly operable to couple to the lower chamber assembly and form an enclosed plenum, the plenum operable to maintain a pressurized and/or temperature controlled environment;

a tool for receiving a set of unprocessed components, the tool being moveable to a first position on the lower chamber assembly in alignment with the upper chamber assembly to be enclosed in the plenum,
from a second position where the tool is not enclosable within the plenum;

a flexible member positionable over the set of unprocessed components within the tool when the tool is at the second position;

a coupling system operable to provide services to the tool and the plenum; and a controller coupled to the upper or lower chamber assembly and the coupling system, the controller operable to direct the services to the tool in accordance with a set of process parameters for thermally processing and consolidating the set of unprocessed components within the tool when the tool is enclosed in the plenum;

wherein the coupling system includes a connection that is fixedly attached to the upper or lower chamber assembly and penetrates the upper or lower chamber assembly, and an automatic coupling arrangement configured to automatically engage the tool within the enclosed plenum with the connection for connecting the services to the tool when the tool is within the enclosed plenum, and automatically disengage tool within the enclosed plenum from the connection for disconnecting the services from the tool when the tool is to be withdrawn from within the enclosed plenum to the second position or to a third position where the tool is not enclosable within the plenum, leaving the tool free of interconnecting piping and wiring when the tool is at the second or third position.

17. The thermal processing and consolidation system of claim 16, wherein the automatic coupling arrangement comprises a pull-push mechanism configured to automatically engage and disengage the tool within the enclosed plenum with and from the permanent connection in a first direction transverse to a second direction in which the upper chamber assembly is moveable relative to the lower chamber assembly to open and close the enclosed plenum.

* * * * *